US008920990B2

(12) United States Patent
Solis Herrera

(10) Patent No.: US 8,920,990 B2
(45) Date of Patent: Dec. 30, 2014

(54) DEVICE FOR PERFORMING A PHOTOELECTROCHEMICAL METHOD OF SEPARATING WATER INTO HYDROGEN AND OXYGEN

(71) Applicant: Arturo Solis Herrera, Aguascalientes (MX)

(72) Inventor: Arturo Solis Herrera, Aguascalientes (MX)

(*) Notice: Subject to any disclaimer, the term of this patent is extended or adjusted under 35 U.S.C. 154(b) by 0 days.

(21) Appl. No.: 13/891,386

(22) Filed: May 10, 2013

(65) Prior Publication Data
US 2013/0288144 A1 Oct. 31, 2013

Related U.S. Application Data

(60) Division of application No. 12/001,138, filed on Dec. 10, 2007, now Pat. No. 8,455,145, which is a continuation-in-part of application No. PCT/MX2005/000092, filed on Oct. 13, 2005.

(30) Foreign Application Priority Data

Jun. 9, 2005 (MX) .................... GT/a/2005/000006

(51) Int. Cl.
*H01M 8/06* (2006.01)
*C25B 1/00* (2006.01)
*H01M 14/00* (2006.01)

(52) U.S. Cl.
CPC ............. *H01M 8/0656* (2013.01); *C25B 1/003* (2013.01); *H01M 14/005* (2013.01); *Y02E 60/364* (2013.01); *Y02E 60/368* (2013.01)
USPC ........................................................ 429/422

(58) Field of Classification Search
CPC ... H01M 14/005; H01M 8/0656; C25B 1/003
See application file for complete search history.

(56) References Cited

U.S. PATENT DOCUMENTS

| 3,925,212 A * | 12/1975 | Tchernev ...................... 422/186 |
| 4,366,216 A | 12/1982 | McGinness |
| 2004/0231719 A1 | 11/2004 | Meredith |
| 2005/0183962 A1* | 8/2005 | Oakes ........................... 205/340 |
| 2006/0166067 A1 | 7/2006 | Kiefer et al. |
| 2008/0213641 A1 | 9/2008 | Ostermann et al. |
| 2009/0107217 A1 | 4/2009 | Huang |
| 2009/0134007 A1 | 5/2009 | Solis Herrera |

FOREIGN PATENT DOCUMENTS

| EP | 1900850 A1 | 3/2008 |
| WO | 03096465 A1 | 11/2003 |
| WO | 2004006292 A2 | 1/2004 |
| WO | 2005088758 A2 | 9/2005 |

OTHER PUBLICATIONS

Serban, Andrei, and Arie Nissenbaum. "Light Induced Production of Hydrogen from Water by Catalysis with Ruthenium Melanoidins." International Journal of Hydrogen Energy 25.8 (2000): 733-37.*
Application of the Electrochemical Quartz Crystal Microbalance for Electrochemically Controlled Binding and Release of Chlorpromazine from Conductive Polymer Matrix; Hepel, et al.; Microchemical Journal 56, pp. 54-64 (1997); Article No. MJ961436.
Reexamination of the Structure of Eumelanin; Ito; School of Hygiene, Fujita-Gakuen Health University, Toyoake, Aichi 470-11; Received Mar. 7, 1986; Biochimica et Biophysica Acta 883 (1986) pp. 155-161, Elsevier.
Light Induced Production of Hydrogen from Water by Catalysis with Ruthenium Melanoidins; Serban et al.; The Weizman Institute of Science, Rehovot, 76100, Israel; Available online Apr. 24, 2000.
The Radioprotective Properties of Fungal Melanin are a Function of its Chemical Composition, Stable Radical Presence and Spatial Arrangement; Dadachova et al.; Pigment Cell Melanoma Res. 21; pp. 192-199; 2007.
Dielectric Studies on Charge Hopping in Melanin Polymer; Jastrzebska, et al.; Journal of Molecular Structure 606 (2002) pp. 205-210.
Electrochemical Self-Assembly of Melanin Films on Gold; Pilar Diaz, et al.; Langmuir 2005, 21, pp. 5924-5930.
Hair Follicle Pigmentation; Slominski, et al.; The Society for Investigative Dermotology, Inc.; 2004.
Interactions of Melanin with metal Ions. Electron Spin Resonance Evidence for Chelate Complexes of Metal Ions with Free Radicals; Felix et al.; Contribution from the National Biomedical ESR Center, Department of Radiology, Medical College of Wisconsin, Milwaukee, Wisconsin 53226; Received Oct. 13, 1977; Journal of the American Chemical Society, 100:12, Jun. 7, 1978.
Characterization of Melanin in Human Iridal and Choroidal Melanocytes from Eyes with Various Colored Irides; Wakamatsu, et al.; Pigment Cell melanoma Res. 21; pp. 91-105; The Authors, Journal Compilation, 2007.
Macular Pigment and Percentage of Body Fat; Nolan, et al.; Investigative Ophthamology & Visual Science, Nov. 2004, vol. 45, No. 11; Association for Research in Vision and Ophthalmology.

(Continued)

*Primary Examiner* — Barbara Gilliam
*Assistant Examiner* — Stephan Essex
(74) *Attorney, Agent, or Firm* — Panitch Schwarze Belisario & Nadel LLP

(57) ABSTRACT

The invention is directed to a system for hydrogen production from water, known as a photoelectrochemical system. The system integrates a semiconductor material and a water electrolyzing material inside a monolithic design, to produce hydrogen directly from water. Natural or synthetic light is used as the main or sole source of energy. The water electrolyzing material is melanins, melanin precursors or melanin derivatives, melanin variants, melanin analogues, natural or synthetic, pure or mixed with organic or inorganic compounds, metals, ions, drugs. The system or light absorbing compound generates enough energy to start, lead and complete the photoelectrolysis reaction. The system can generate hydrogen, oxygen and high energy electrons, and can synthesize water from the union of hydrogen and oxygen, thereby generating electricity. The system can also be coupled to other processes, generating a multiplication effect, and can be used for the reduction of carbon dioxide, nitrates, sulphates and the like.

17 Claims, No Drawings

(56) References Cited

OTHER PUBLICATIONS

Melanin Directly Converts Light for Vertebrate Metabolic Use: Heuristic Thoughts on Birds, Icarus and Dark Human Skin; Med Hypotheses; May 12, 2008; 18479839 (P,S,E,B,D).

Melanin: ¿ Fuel of the Future?; Solis Herrera, Arturo.

Semiconducting Photoactive Biopolymers; Meredith, et al.; Soft Condensed Matter Physics Group; University of Queensland Department of Physics; Prof. Sarna; Institute of Molecular Biology, Jagiellonian University, Krakow, Poland; Willis, et al.; School of Physical Sciences, Queensland University of Technology.

Photoprotection of Human Retinal Pigment Epithelium Cells Against Blue Light-Induced Apoptosis by Melanin Free Radicals from Sepia Officinalis, Seagle etal., Nov. 2006, vol. 103, No. 45, Proceedings of the Natural Academy of Sciences.

Photoelectrochemical Properties of Melanin; Solis, et al.; Nature Precedings; Posted Nov. 12, 2007.

Melanin Pigmentation in Mammalian Skin and its Hormonal Regulation; Slominski, et al.; The American Physiological Society, 2004.

The Function of Melanin or Six Blind People Examine an Elephant; Hill; BioEssays, vol. 14, No. 1—Jan. 1992.

The Physical and Chemical Properties of Eumelanin; Meredith, et al.; Pigment Cell Res. 19; pp. 572-594, 2006.

Analysis of Kinetic Model for Melanin Biosynthesis Pathway; Rodriguez, et al.; The Journal of Biological Chemistry; vol. 267, No. 6, Issue of Feb. 25, pp. 3801-3810, 1992.

Physical Studies on Melanins; II. X-Ray Diffraction; Thathachari et al.; From the Department of Dermotology, Standford University School of Medicine, 1969, vol. 9, pp. 77-89, Biophysical Journal.

\* cited by examiner

DEVICE FOR PERFORMING A PHOTOELECTROCHEMICAL METHOD OF SEPARATING WATER INTO HYDROGEN AND OXYGEN

CROSS-REFERENCE TO RELATED APPLICATION

This application is a Divisional of U.S. patent application Ser.No. 12/001,138, filed Dec. 10, 2007, now U.S. Pat. No. 8,455,145, issued Jun. 4, 2013, which was a Continuation-in-Part of International Application No. PCT/MX2005/000092, filed Oct. 13, 2005, and the disclosure of which is incorporated herein by reference.

FIELD OF THE INVENTION

This invention relates to the processes or methods for obtaining alternative energy, particularly the ones known as photoelectrochemical processes, through which hydrogen and oxygen atoms are obtained by means of the separation or partition of water molecule with which we generate hydrogen and oxygen atoms. Moreover, high energy electrons are generated, and very possibly this method can be applied to the reduction of carbon dioxide, nitrate and sulphate molecules. Because the reactions occur in both ways, our invention can also be applied to electricity generation, for our method permits to bind hydrogen and oxygen atoms forming water molecules, and collaterally generating electrical current.

BACKGROUND OF THE INVENTION

About the related art, nowadays, the known processes used up to now to separate the water molecule in hydrogen and oxygen atoms are, among others:
a).—The application of intense electrical currents.
b).—The heating of water until two thousand degrees centigrade.
c).—The separation of water molecule by solar electrochemical method: (photoelectrochemical), which integrates a semi-conductor material and a water electrolyzer in a monolithic design to produce hydrogen directly from water using light as the unique energy source. Simple in concept, the challenge was to find a material or base that could support the whole process, and up to now, the ideal or the most adequate material had not found because some materials are very expensive, some are polluting, others are inefficient; most of them decompose fast, others are damaged with water and some others require exceedingly strict work conditions; that is why cost-effectiveness has not been feasible up to now from an economical, environmental and political point of view, and others are not appropriate for large scale application, their usefulness being thus reduced to some specific and small processes
d).—Another method to separate water is by solar energy concentration (with mirrors for example), with the object to elevate water temperature until two thousand ° C. This is the required temperature used in laboratory to divide the water molecule.
e).—One further method is by using photosynthetic microbes as green algas and cianobacterium, those produce hydrogen from water as part of metabolic activities using light energy as main source. This photobiological technology is promising, but as oxygen is produced as well as hydrogen, the technology must solve the limitation that is the sensibility to oxygen in the enzymatic systems. Besides, hydrogen production from photosynthetic organisms is currently too low to be economically viable.
f).—Another method is water electrolysis, using electricity to separate the water molecule in its compounds (hydrogen and oxygen atoms). At present time, two kinds of electrolyzers are used for commercial production of hydrogen: the alkaline, and the membrane of protons interchange, but these approaches cannot compete now from an economic point of view with the hydrogen produced from natural gas. (Source: U.S. Department of Energy, Efficiency and Renewable Hydrogen fuel cells and Infrastructure Technology Program Hydrogen Production & Delivery).

A natural material that can also divide or separate the water molecule and that has been studied is chlorophyll but because its affinity with light is between 400 nm and about 700 nm the rest of the light energy is lost. That is why it is estimated that 80 percent of used energy is wasted. Moreover, its production is complex and expensive, requiring for example temperatures of −8° C. These are the reasons by which we decided to use the melanins as electrolyzing water element, because its affinity in the spectrum goes from 200 to 900 nm or more, and because of the physiological characteristics of the tissues in which melanin generally occurs. Parameters such as the oxygen concentration call the attention and that is why we decided to contrast the hypothesis that when melanin is illuminated, we would get the photolysis of the water molecules, generating thus oxygen and hydrogen atoms, besides other products such as OH, hydrogen peroxide, anion superoxide and high energy electrons, as well as support and catalyze the reverse reaction.

Before our work, the photohydrolitic and hydrosynthetic properties of melanin, the so called melanin response to electrroretinogram only had historical interest. In the early sixties, it was discovered that intense non physiological luminous stimulus applied to the pigmented ephythelium of the retina, generated potential changes throughout it. This response to melanin reflects a physicochemical response to light absorption by melanin, similar in some way to the early potential of electrorretinogram receptors generated by opsin molecules.

The literature points out that researchers have not found the clinical application to the melanin response yet. And we add that this is due to the fact that the process of said event had not been understood. Now we know that portions surrounding the molecule collect photon energy and through it the water molecule is divided, that is, they oxide it, separating hydrogen from oxygen, then the hydrogen, the carrier of energy by excellence is caught possibly by FAD and NAD for its further processing by eukaryote cell to energize one or other reaction among the many that occur every second and lead to life. But the wonder of the event is that also the structure of (primary, secondary, third, fourth) melanin permits the occurrence of the opposite reaction, i.e. the union of hydrogen and oxygen, or in other words, the reduction of oxygen, that produces water and electricity. The absorption of light by the melanin starts an ionic event that finally gives us electricity, because the sole division of water molecule is not enough; the reversibility of the reaction has to happen, i.e. the reunion of the hydrogen and oxygen atoms.

DETAILED DESCRIPTION OF THE PREFERRED EMBODIMENT

Any range or ranges disclosed in this description are deemed to include and provide support for any sub-range within those range or ranges. Any range or ranges disclosed in this description are deemed to include and provide support for any point or points within those range or ranges.

This invention consists essentially in obtaining under normal temperature, and using natural or artificial light, as the only source of energy, the division of water molecule to obtain hydrogen and oxygen atoms as well as electrons of high energy or join hydrogen or oxygen atoms to obtain water and electric current; using as main or central electrolyzing melanin, melanin precursors, melanin derivatives and melanin analogues: polihydroxyindole, eumelanin, feomelanin, alomelanin, neuromelanin, humic acid, fulerens, graphite, polyindolequinones, acetylene black, pyrrole black, indole black, benzene black, thiophene black, aniline black, poliquinones in hydrated form sepiomelanins, dopa black, dopamine black, adrenalin black, catechol black, 4-amine catechol black, in simple linear chain, aliphatics or aromatics; or their precursors as phenoles, aminophenols, or diphenols, indole poliphenols, ciclodopa DHI Y DHICA1, quinones, semiquinones or hydroquinones. L-tyrosine, L-dopamine, morpholin, ortho benzoquinone, dimorpholin, porphirin black, pterin black, ommochrome black, free nitrogen precursors, any of the above listed with any size or particles. (from 1 angstrom to 3 or 4 cms.). All afore mentioned the compounds, electroactive, in suspension, solution, in gel, that absorb the ultrasound in the interval of one MHz, natural or synthetic, with vegetal, animal or mineral origin; pure or mixed with organic or inorganic compounds, ions, metals, (gadolinium, iron, nickel, copper, erbium, europium, praseodymium, dysprosium, holmium, chromium or magnesium, lead selenure, and so on). Gadolinium is a very effective metal. The metal is incorporated into the melanin in ionic form or as a particle, as well as drugs or medication energizing the photo electrochemical design with light (natural or synthetic, coherent or not, monochromatic or polychromatic) with wavelength mainly between 200 and 900 nanometers, though other wavelengths and other energy types, for example, the kinetic, also are efficient in various grades, according to the rest of the conditions (pH, temperature, pressure, and so on). To this kind of designs magnetic fields from soft to significant intensity can be applied.

The events in this design may occur to a greater o lesser extent under internal or external physical or chemical stimuli.

We propound the use of melanin (as mentioned before) as the electrolyzer material of the water molecule, using light as main or sole energy source, particularly at wavelength between 200 and 900 nm for the hydrogen production systems known as photoelectrochemical methods. As aforementioned, these systems integrate a semiconducting material and a water electrolyzer inside a monolithic design to produce hydrogen atoms directly from water, using light as the main or sole source of energy, though sound, ultrasound, in an interval of one MHz, mechanical stir, magnetic fields, etc. can also be used.

Although, it is a simple concept, the challenge was to find a material that could withstand the whole process. At least two basic criteria had to be met: one was the light absorbing system or compound had to generate enough energy to start, lead and support completely the electrolysis reaction, and it had to be low cost, stable and long lasting in a water environment.

Melanin, melanin precursors, melanin derivatives, melanin variants and analogues can meet reasonably and efficiently the above mentioned requirements and this represents a progress to solve the central problem of photoelectrochemical designs.

The shape of the container holding it in the appropriate equipment can be very varied: cubic, cylinder, spherical, polyhedral, rectangular, etc. Being one of the main requirements, to be transparent, in order to permit the light to pass through and depending on the wavelength of the illumination that is going to be used, the walls could be made of quartz, for example, so that the walls of the container do not absorb the ultraviolet radiations, or if a specific wavelength is determined, the material of which the container is made could be of a color that allow maximum transparency or absorption of the wavelength from the electromechanical spectrum which we are interested in. The walls can be made of glass or of any other polymer whose transmission characteristics of the electromagnetic radiations fit to the final needs of the photoelectrochemical design. The wavelengths that can be used to energize the design comprise from 200 nanometers to 900 nanometers.

Inside the cell, the main material, the essential solute, melanin precursors, melanin derivatives, melanin variants and analogues, mainly dissolved in water, because the basis of the design is the notable capacity of melanin to capture photons of wavelengths comprised between 200 and 900 nm, probably by the surrounding portions of the molecule, followed by the generation of high energy electrons from low energy electrons. These high energy electrons go to the centers of free radicals of the compound where they are probably captured by an element for example: a metal such as iron, copper, gadolinium, europium, etc. from where they are transferred to a primary electron acceptor from a nature that is uncertain up to now because the union is complex and comprises ionic interactions depending on the pH. This electron transfer liberates energy which is used to establish the protons gradient.

The combination of the melanin molecule with water forms what can be called a photosystem, which captures luminous energy using at least two interrelated activities: removal of electrons from water and generation of a protons gradient.

The melanin components are in very close contact among them which makes a fast transfer of energy easy. At three picoseconds of illumination, the melanin reaction centers respond transferring a photo-excited electron to the primary electron receptor. This transference of electrons generates a donator, positively charged and a receiver negatively charged. The importance of the formation of two species with opposite charges is seen when we consider the reduction capacities of these two species, because one of them is deficient in electrons and can accept electrons which makes it an oxidizing agent. By contrast, the other compound has an extra electron that can be lost easily, making it a reducing agent. This event—the formation of an oxidizing agent and a reducing agent from the light⁻ takes less than billionesimal of second and is the first essential step in the photolysis.

Because they are charged in an opposite way, these compounds show an obvious mutual attraction. The separation of charges is (probably) stabilized by their movement to opposite sides of the molecule; being the negative compound the one that first gives its electron toward a quinone (Q1) and possibly then the electron is transferred to a second type of quinone (Q2), this producing a semi reduced form of the quinone molecule which can be strongly linked to the reaction center of the melanin molecule. With each transfer, the electron gets closer to the reaction center of the melanin molecule. The portion of melanin positively charged is reduced, thus preparing the reaction center for the absorption of another photon. The absorption of a second photon sends a second electron along the way. (melanin negatively charged towards the first and second quinone molecule—Q1 and Q2 -). This second molecule absorbs two electrons, and thus combines with two protons. The protons used in this reaction could derive from the same melanin molecule or from the surrounding water, causing a decrease in the concentration of hydrogen ions of the photosystem, what contributes to the formation of a protons gradient. In theory the reduced quinone molecule is dissociated from the reaction center of melanin, been replaced reaction by a new quinone molecule. These reactions occur at normal temperature but when you modify for example the temperature you can favor the reaction in one or other way, depending on the control of the other variables: (pH, magnetic fields, concentrations, gases, partial pressures, shape of cells, etc.) and the main objective of the process.

The separation of water molecules into hydrogen and oxygen atoms is a highly endergonic reaction due to the very stable association of hydrogen and oxygen atoms. The separation of the water molecules (in hydrogen and oxygen atoms) in the laboratory requires the use of a strong electric current or high temperature of almost 2,000° C. the above (water electrolyzing) is obtain by melanin at room temperature, using only the energy obtained from light, wavelength mainly comprised between 200 and 900 nanometers, either from natural or artificial source, coherent or not, concentrated or disperse, mono or polychromatic. It is estimated that the redox potential of oxidized form of quinone is approximately +1.1 V, what is strong enough to attract the firmly united low energy electrons from the water molecule (redox potential of +0.82), separating the molecules in hydrogen and oxygen atoms. The separation of the water molecule by photopigments is named photolysis. It is believed that the formation of the oxygen molecule during the photolysis requires the simultaneous loss of four electrons from two water molecules according to the reaction:

$$2H_2O \leftrightarrow 4H^+ + O_2 + 4e^-$$

A reaction center can only generate a positive charge or its oxidizing equivalent at the same time. This problem is solved hypothetically by the presence of four nitrogen atoms in the reaction center of the melanin molecule, each one of them transferring only one electron. This nitrogen concentration, adds may be four positive charges upon transferring four electrons (one each time) to the closest quinone$^+$ molecule.

The transfer of electrons from the nitrogens of the reaction centers to the quinine$^{30}$ is obtained by means of the passage through a positively charged tyrosine moiety. After each electron is transferred to quinone$^+$, regenerating quinone, the pigment is reoxidized (again a quinone$^+$) after the absorption of another photon to the photosystem. So the accumulation of four positive charges (oxidizing equivalents) by the nitrogen atoms of the reaction center is modified by the successive absorption of four photons by the melanin photosystem. Once the four charges have been accumulated the oxygen releasing quinone complex can catalyze the 4e$^-$ removal from 2H$_2$O forming an O$_2$ molecule, and regenerating the totally reduced quantity of nitrogens in the reaction center.

The protons produced in the photolysis are released in the medium where they contribute to the protons gradient. The photosystem must be illuminated several times before the occurrence of O$_2$ release and thus hydrogen can be measured; this indicates that the effects of the individual photo reactions must accumulate before O$_2$ and hydrogen are released.

The quinones are considered carriers of mobile electrons. It is to be kept in mind that all electron transfers are exergonics and occur as the electrons are successively taken to carriers with an increasing affinity for the electrons (more positive redox potentials). The need of having electron moving carriers is obvious. The electrons generated by the photolysis can pass to several inorganic receivers, which are thus reduced.

These ways for electrons can lead (depending on the composition of the used mix) to the eventual reduction of nitrate molecule (NO$_3$) into ammoniac molecule (NH$_3$) or the sulphates in sulphydrides (SH$^-$) reductions that change the inorganic wastes into compounds necessary for life. So the sunlight energy can be used not only to reduce the most oxidized form of a carbon atom (CO$_2$) but also to reduce the most oxidized forms or nitrogen and sulphur.

The production of one O$_2$ molecule requires the removal of four electrons from two molecules of water, the removal of four electrons from water requires the absorption of four photons, one for each electron.

The design of the cell is an important parameter for the optimization in obtaining the product of the reaction in which we have a particular interest, because the addition of electrons, the nature of them, the use of magnetic fields, the addition of several compounds (organic or inorganic, ions, metals, drugs or medications) to the photosystem that at the beginning was only melanin and water, plus the addition of electrolytes, plus the addition of medicines, and temperature management, the control of partial pressures of gases, the management of the electrical current generated, the application of magnetic fields, the level of pH, the material used in making the cells and the shape and disposition of its internal divisions, etc. Apart from other variables, which are able to be controlled in such a way that the final design can recover electrons, or protons, or oxygen, and the resulting compounds according to the formulation of the medium in the melanin is dissolved. Thus, the melanins, melanin precursors, melanin derivatives, melanin variants and analogues (its analogues, its synthetic or natural precursors, pure or combined with organic compounds and inorganic compounds, metals) allow a notable flexibility of the design according to the goals to reach.

The optimization of photoelectrochemical design relates to the objectives, for example: for a higher generation of protons and oxygen or generation of electricity; the largest possible area of exposition of the liquid compound to the light in an extended container, apart from other procedures such as the addition of electrons carrier compounds, melanin doping, or positive microlens to concentrate the light, etc.

The design of the container is not limited and can have a spherical, cubic, rhomboidal, polyhedric, plain concave, plain convex, biconvex, biconcave shape with microlens in a side (the side exposed to light to concentrate it) and flat on the other side cylindrical, circular cylindrical, hollow cylindrical, circular cone (straight) truncated cone, rectangular prism, oblique prism, rectangular pyramid, straight truncated pyramid, truncated spherical segment, spherical segmented, spherical sector, spherical with cylindrical perforation, sphere with conic perforations, torus (circular section ring), cylinder with slanted cut, cylindrical wedge, semi prism barrel, and combinations of them, etc, because the liquid assumes any shape, only requiring to be transparent to allow the passage of the maximum possible light, and depending of the kind of melanin used (doped or not, for example), it will be convenient to select a specific wavelength to illuminate the soluble melanin, but until this moment one of the big virtues of soluble synthetic melanin is that it absorbs the majority of the wavelengths in the electromagnetic spectrum. But it appears to show its major absorption between 200 and 900 nanometers wavelengths. The control of the partial pressures of the gases in the interior of the cell is an important variable, and depending on the cell shape and the use given to it, these pressures can go from 0.1 mm Hg until 3 or 4 atmospheres; another variable that must be taken into account is the concentration of different substances dissolved in the liquid, where the critical concentration is mainly of melanin and can go from 0.1% to 100%, the increase could be in steps of 0.1%; other variable that can be modified is the ratio among the different components of the formula (depending on the use), because potassium can be added in a concentration from 0.1 to 10%; sodium in a concentration from 0.1 to 10%; chlorine in a concentration from 0.1 to 10%; calcium in a concentration from 0.1 to 10%; iron in a concentration from 0.1 to 8%, copper in a concentration from 0.1 to 5%, arsenic in a concentration from 0.1 to 8 or 9%, gold in a concentration 0.1 to 8 or 9%, silver in a concentration similar to gold, nickel in a concentration from 0.1 to 8%, gadolinium, europium, erbium, etc.

The final volume can range from 1 microliter to 10 or 20 liters depending on the size of the container and the available space; the temperature can fluctuate from 2 to 45° C., the frequency of change of solution can be from every 15 minutes to several months or 2 or 3 years; the formation of compartments inside the little cell, in the interior of the cell shapes ranging from small spheres (microspheres, there can be several dozens of them) to spheres the size of which could be included 3 or 4 times inside the whole design, and in the shape of the interior of the little cell cubic rhombic, polyhedral, concave plane, convex plane, biconvex, biconcave with microcells, biconvex on one side (the side exposed to light to concentrate it) and flat on the other side, cylindrical, circular cylindrical, hollow cylindrical, circular cone (straight), truncated cone, rectangular prism (straight), oblique prism, rectangular pyramid (straight), truncated pyramid, truncated spherical segment, spherical segment, spherical sector, spherical with cylindrical perforation, sphere with conic perforations, toro (circular section ring), cylinder with slanted cut, cylindrical wedge, barrel, semiprism, can be used including combinations of these, the power of the microlens can range from 0.1 to 100 diopters, the redox properties of the materials used in the formation of the compartments (iron, silver, copper, nickel, gold, platinum, gallium arsenide, silicon, gadolinium, europium, erbium, praseodymium, dysprosium, holmium, chromium, magnesium, lead selenide and alloys of them, etc).

The use or not of cathodes y anodes, their material (for example platinum, iron, silver, gold, steel, aluminum, nickel, arsenium, gadolinium, europium, erbium, praseodymium, dysprosium, holmium, chromo, magnesium; gallium), depending on the optimal characteristics to recover electrons or hydrogen, but it has to be kept in mind that in presence of metal or borium, the hydrogen works with −1; another variable is initial pH of the solution that can range from 2 or 3 to 8 or 9 units of pH, being the most used about 7, the above mentioned variables that can be handled in order to control the photoelectrolysis process depending on the needs of the project in question.

The core of any efficient photoelectrochemical designs are the melanins, i.e. melanin, melanin precursors, melanin derivatives, melanin variants and analogues, water soluble, where they catalyze the photolysis process, without undergoing significant changes except the presence of elements such as magnesium, iron, copper, lead, and others, the resulting products of which together with the resulting products of the partial reduction of the oxygen atom (superoxide anion, hydroxyl radical, hydrogen peroxide, quinones and orthoquinones), can fast or slowly damage the effectiveness of melanin, but in the case of pure melanin, at a 10% concentration, for example, the duration of the compound is long enough to be economically convenient (years), and the synthesis of melanin is a very efficient process. Thus, from an economic and ecological point of view it is very viable, because pure melanin is fully biodegradable. Thus, the little cell only requires a periodic supply of distilled water, as well as a periodic replacement of soluble melanin, or eventually, the renewal of substances added to the design to optimize or potentiate some of the processes occurring as a result of exposing the photo-electrochemical design to the light. The ecological advantage of the final products of the reaction being water molecules, oxygen molecules or atoms, hydrogen, high energy electrons, and electrical current can be easily realized. There is little generation of greenhouse effect $CO_2$ molecules. The transfer of electrons releases energy, which is used to establish a proton gradient.

The proton movement during the electrons transportation can be compensated by the movement of other ions, so using membrane and a solvent with adequate solutes, membrane potential can be formed from photons capture by mean of melanin.

The electrolyzing properties of melanin (among many others) can explain the light generated peak observable in the electroretinogram, because if melanin is illuminated, intracellular pH gets down, that activates the chlorine channels sensitive to pH in the basolateral cellular membrane. (The light peak is an increase of the potential that follows the FOT phase (fast oscillation trough) and forms the slowest and longest lasting component of the electroretinogram from direct current. (Kris 1958, Kolder 1959, Kikadawa 1968, Steinberg 1982).

Melanins, melanin precursors, melanin derivatives, variants and analogues, oxidize the water molecule to O, $O_2$, and $H_2$, absorbing energy obtained by the light (photons), and reduce oxygen atom with hydrogen atoms to $H_2O$, liberating energy (electricity, although it can "keep" the electricity, i.e. it can function as a battery or accumulator, i.e. not only generating energy but also keeping it for a while and within some limits). That is why the cell design can be adapted to the requirements.

$H_2$ and $O_2$ atoms are produced with light, but the generation of these elements can be increased by melanin doping (melanin, its precursors, variants, derivatives, or synthetic or natural analogues) with metals or adding organic and inorganic molecules, also modifying the electrolyte concentrations, adding drugs or controlling the characteristics of light, over the liquid containing water and melanins (melanin, its precursors, variants, derivatives, or synthetic or natural analogues), for example with a design based on microlens to condensate or selecting determinate wavelength, using coherent or disperse, monochromatic, polychromatic, continuous, discontinuous, natural, artificial, light; etc. The photoelectrochemical reactions happen in two ways, i.e. the water molecule is separated but also formed, so it can recover electric current of the design and it can also be optimized through melanin doping with different substances (drugs, metals, electrolytes, organic and inorganic molecules, and others) or by light concentration by mean of lens, among others.

The box containing the liquid can have different shapes that adapt to different needs, in the house roofs, car roofs, plants buildings, industrial processes, etc. cells connected among them, but the central component of the design is melanin (melanins, its precursors, its derivatives, its variants, its analogues, water soluble), that induces and carries out the photolysis of the water molecule, in presence of light.

The melanins, melanin precursors, melanin derivatives, melanin variants and analogues remove electrons from water and generate a gradient of protons.

The light depending reactions can also generate energy to reduce $CO_2$ to $CH_2O$, nitrates to ammonia and sulphates to sulphydriles.

A compound that has been reported in the literature and that has shown to induce and carry out these processes is the chlorophyll but because it absorbs light mainly in the extreme regions of the visible spectrum, it is estimated that 80% of the irradiated energy is wasted, in contrast, with our offer to use melanin, because it practically absorbs soft and hard ultraviolet electromagnetic radiations, all the visible spectrum and the far and near infrared lengths (Spicer & Goldberg 1996). It would not be surprising that it could absorb other types of energy such as kinetic energy or other wavelengths of the electromagnetic spectrum.

EXAMPLES

We conducted small scale experiments. Once we inferred these interesting properties of melanins according the structure activity relation, we placed soluble synthetic melanin in water, forming a 1% solution in five 20 mL transparent, high density polythene flasks, at room temperature. We measured the pH before and after lighting them during 30 minutes with visible light of natural source (sun) not concentrated; measuring the pH, we obtained in average a decrease of two decimals of unit of pH (from 7.3 to 7.1), we consider it significant because melanins have buffering property per se, so the change must be larger, but is hidden by melanin intrinsic buffering property, and thus we only detected part of this pH modification, a change of pH the magnitude of which is related to the biological system, because if it were greater, it would probably severely destroy or damage the cell, but a change of this size is enough to induce biological changes that involves said extraordinary compound. To determine the biological magnitude of a decrease of 0.2 units of pH, we will mention that, in the case of blood, this reduction increases more than 10% the calcium concentration.

Besides, the total blood pH ranges from 7.38 to 7.44, the arterial blood pH ranges from 7.36 to 7.41, and the vein blood pH ranges from 7.37 to 7.45, i.e., the variations are within a very narrow margin, and thus a difference of 2 decimals of unit of pH is really significant in a biological system.

In an initial close design we estimated the liberation of hydrogen in function of electric current generation, and obtained 50 mV on average and 110 mV between each peak, corresponding to about one to two units of pH, what is equivalent to the production of $1 \times 10^{-7}$ mol/liter of hydrogen per each pH unit, because the molecular weight of hydrogen indicates that a mol of it is equal to a gram of hydrogen.

On the other hand, the melanocyte, is the cell showing most affinity for calcium in the organism, showing an affinity one thousand times higher than the bone, because although the latter has a larger quantity, it is only deposited in mineral form.

It is to be noted that this change from 0.2 to 1.0 units of pH, as well as its reversion when they were placed in flasks in a dark place, was foreseen by our theoretical system, i.e. when we made the experiment we knew the result we were going to obtain, in other words, we did not make many experiments, we only made it twice or three times, resulting as we expected. The solutions of melanin used in the experiments had been prepared for at least 3 years, were not doped; and as pointed out by the theoretical system, it is a very long lasting compound, very stable in water, that does not require preservatives, or refrigeration, is not contaminated with microorganisms despite the age of the preparation, and these solutions only need to be kept in a fresh and dry place; that is why we were relatively sure that the reaction was going to happened, though we could not foresee its magnitude because the buffering capacity of melanin is not known or it is not possible to assess it exactly because the melanin formula is not fully known.

This experiment also demonstrated that melanin does not require preservatives and its electrolyzing properties are maintained despite the time (3 years after being synthesized). We are now working on improving the protocols to answer to some of the many questions that are generated through these experiments, but because of the extraordinary possibilities of industrial, medical, energetic, and laboratory applications of the electrolyzing characteristics of melanin, we decided to protect immediately its use in the photoelectrochemical processes of energy generation.

A photoelectrochemical system was built that works with natural light, the reactive cell of which contains up to 1.3% of melanin, i.e. more than 98% is water. Optionally metals or drugs can be used to increase its efficiency. The little cell has been hermetically sealed to avoid that gases generated escape. Another variable refers to the electrodes, their geometry and nature that can be conductors, semiconductors or semimetals. Each millimeter of electrolyzing material has produced 10 millivolts and microampers day and night, during years, recharges of electrolyzing material or water have not been required; it has been conducted at room temperature showing that it is an efficient, economical and versatile photolectrochemical system.

In this example, we managed to light the first light emitting diode (LED), which remains lit six months later. The cells do produce electricity and we are working on making them more efficient and scaling them up to competitive costs. Initially, we used a concentration of 1.3% melanin and 98.7% water. Later, when we increased the concentration of melanin to 4%, the generation of electricity increased exponentially. In terms of technological development, we have achieved progress I consider to be significant and which can reflect the potential of such cells.

Besides, we were able to connect up a small music player, since each cell now produces 600 mV and 200 mA, that is, a thousand times more than the 200 µA we used to achieve.

We have produced a liter and a half of melanin every three months and our cells were of 30 mL and produced 400 mV and 10 µA. However, currently, in our small laboratory, we produce about 200 liters of melanin daily.

I claim:

1. A device for performing a photoelectrochemical process to generate energy, the device comprising:
   a cell containing an aqueous solution of at least one water electrolyzing material, each of the at least one water electrolyzing materials present in the aqueous solution being a water-soluble water electrolyzing material selected from melanin, melanin precursors, melanin derivatives, melanin analogues, and melanin variants;
   a source of energy; and
   a pair of electron receiving electrodes.

2. The device according to claim 1, wherein the source of energy is selected from natural light, artificial light, electromagnetic waves, radio waves, and gamma rays.

3. The device according to claim 2, wherein the source of energy is light energy and the device further comprises a lens to concentrate the light energy.

4. The device according to claim 3, wherein a surface of the lens exposed to the light energy is biconvex.

5. The device according to claim 4, wherein a power of the lens is in a range of 0.1 to 100 dioptres.

6. The device according to claim 1, wherein the water-soluble water electrolyzing material comprises melanin.

7. The device according to claim 1, wherein the water-soluble water electrolyzing material is doped with a metal or an organic or inorganic compound.

8. The device according to claim 1, wherein the source of energy is light energy having a wavelength in a range of 200 to 900 nm.

9. The device according to claim 8, wherein the light energy is natural light.

10. The device according to claim 1, wherein the aqueous solution has a pH in a range of 2 to 9.

11. The device according to claim 1, wherein the device functions as a battery or accumulator.

12. The device according to claim 1, wherein magnetic fields are applied to the cell.

13. The device according to claim 1, wherein the cell is made of a material that permits transmission of electromagnetic waves for activation of the process.

14. The device according to claim 13, wherein the cell is made of glass or polyethylene.

15. The device according to claim 1, wherein the cell is segmented.

16. The device according to claim 1, wherein the cell is a closed cell.

17. The device according to claim 1, wherein partial pressures of gases formed within the cell are in a range of 0.1 mm Hg to 4 atmospheres.

* * * * *